United States Patent [19]

Peiffer et al.

[11] Patent Number: 5,508,090

[45] Date of Patent: Apr. 16, 1996

[54] HEAT-SEALABLE, ORIENTED, MULTILAYER POLYOLEFIN FILM, PROCESS FOR THE PRODUCTION THEREOF, AND THE USE THEREOF

[75] Inventors: Herbert Peiffer, Mainz; Ursula Murschall; Gunter Schloegl, Kelkheim, all of Germany

[73] Assignee: Hoechst Aktiengesellschaft, Frankfurt am Main, Germany

[21] Appl. No.: 214,253

[22] Filed: Mar. 17, 1994

[30] Foreign Application Priority Data

Apr. 1, 1993 [DE] Germany ............... 43 10 684.6

[51] Int. Cl.⁶ .................................................. B32B 7/02
[52] U.S. Cl. ........................ 428/214; 428/349; 428/404; 428/331
[58] Field of Search .................... 428/516, 349, 428/404, 331, 214

[56] References Cited

U.S. PATENT DOCUMENTS

| | | | |
|---|---|---|---|
| 4,375,494 | 3/1983 | Stokes | 428/323 |
| 4,590,125 | 5/1986 | Balloni et al. | 428/349 |
| 4,711,673 | 12/1987 | Musselman et al. | 106/287.17 |
| 4,956,232 | 9/1990 | Balloni et al. | 428/349 |
| 5,110,671 | 5/1992 | Balloni et al. | 428/218 |
| 5,164,439 | 11/1992 | Sakamoto et al. | 524/425 |

OTHER PUBLICATIONS

Derwent Publications Ltd., AN 81–80575D, Abstract JP 56–118444.

*Primary Examiner*—Edith Buffalow
*Attorney, Agent, or Firm*—Foley & Lardner

[57] ABSTRACT

An oriented, heat-sealable, multilayer polyolefin film is described, which includes a base layer containing polypropylene and resin, and at least one heat-sealable outer layer. The heat-sealable outer layer contains a propylene copolymer and/or a propylene terpolymer and a mixture of an antiblocking agent having a mean particle diameter of from 3 to 5 μm and a further antiblocking agent having a mean particle diameter of from 1 to 2.5 μm. In addition, a process for the production of the multilayer polyolefin film and the use of the film are described.

21 Claims, No Drawings of a polypropylene copolymer and/or polypropylene terpolymer with

HEAT-SEALABLE, ORIENTED, MULTILAYER POLYOLEFIN FILM, PROCESS FOR THE PRODUCTION THEREOF, AND THE USE THEREOF

BACKGROUND OF THE INVENTION

1. Field of the Invention

The invention relates to an oriented, heat-sealable, multilayer polyolefin film comprising a base layer containing polypropylene and resin, and at least one heat-sealable outer layer. The films are distinguished by excellent heat-sealing properties and excellent running properties on high-speed packaging machines.

2. Description of the Related Art

The demands made of the processing properties of films and their smooth passage through automatic machines have increased continually over the years. Modern automatic packaging machines as used, for example, in the cigarette industry, operate at a rate of 350 to 450 wrappers per minute. Films which run on such machines require properties which are carefully balanced with respect to each other. The problem that frequently occurs is that optimization of one parameter unacceptably impairs another property.

Films which have good running properties due to a balanced synergistic formulation are known. EP-A 0,468,333 describes a multilayer polypropylene film having improved barrier properties whose base layer contains a hydrocarbon resin having a softening point of greater than or equal to 140° C. The multilayer film has an outer layer of propylene copolymers or terpolymers. The base layer and/or the outer layer contain(s) an antiblocking agent and/or lubricant. These films have unsatisfactory blocking properties at elevated temperatures.

EP-A-0,182,463 describes a multilayer heat-sealable film containing 0.05 to 0.2% by weight of tertiary aliphatic amine in the base layer and a combination of silicone oil and $SiO_2$ in the heat-sealable outer layer.

According to the description, the surprising interaction of $SiO_2$, silicone oil and amine in combination with a selected outer layer thickness of less than 0.8 μm gives films having a coefficient of friction of 0.3 or less. This film has the disadvantage that the outer layer thickness cannot exceed 0.8 μm, without greatly impairing the running properties.

EP-A-0,143,130 discloses multilayer heat-sealable films containing a carboxamide in the base layer and also a combination of silicone oil and $SiO_2$ in the outer layer. As in EP-A-0,182,463 mentioned above, a synergistic effect of the three selected components on the coefficient of friction is described. However, these films have deficient blocking behavior at elevated temperature, in spite of their advantageous surface slip.

EP-A-0,194,588 and EP-A-0,217,598 describe films in which silicone oil, and if desired in combination with $SiO_2$, is incorporated only into one outer layer. The second, silicone oil-free outer layer is corona-treated to improve the printability. The transfer of silicone oil onto the surface of this treated second outer layer subsequently takes place by contact with the first, silicone oil-containing outer layer. This feature gives a silicone oil-treated film having good surface-slip characteristics which is simultaneously readily printable on the corona-treated side, but is nevertheless heat-sealable.

The films of the prior art are all unsatisfactory with respect to their running properties, their heat-sealing properties and their blocking values at elevated temperature.

There is a continuous need in the packaging industry to keep packing costs as low as possible. For this reason, it is always attempted to allow the machines to run at minimum speed, since this is associated with greater economic efficiency. An important limiting factor for the maximum speed is the film with its properties.

SUMMARY OF THE INVENTION

It is therefore an object of the present invention to provide heat-sealable films which run rapidly and in a trouble-free and energy-saving manner on automatic packaging machines, with no impairment of the quality of the packaging. Another object of the invention is that the film should have very good barrier properties with respect to water vapor, oxygen and aromas, but not at the expense of superior running properties and heating sealing properties.

A further object of the invention is to provide a heat-sealable film which has a low sealing temperature. Still another object of the present invention is to provide a heat-sealable film which has a rapid sealing time but still provides high seal strength.

Still another object of the present invention is to provide a process for the production of the multilayer polyolefin heat-sealable film by a coextrusion process. A further object of the film is to supply a packaged article which is made of the heat-sealable film surrounding the article to be packaged. Another object of the invention is to provide a mixture of antiblocking agents which is added to heat-sealable films, preferably multilayer polyolefin films and provides superior blocking properties at elevated temperatures.

In accomplishing the foregoing objectives, there has been provided according to one aspect of the present invention, an oriented, heat-sealable, multilayer polyolefin film comprising a base layer containing polypropylene and resin, and at least one heat-sealable outer layer, wherein the heat-sealable outer layer contains a polypropylene copolymer and/or a polypropylene terpolymer and a mixture of a first antiblocking agent having a mean particle diameter from about 3 to 5 μm and a second antiblocking agent having a mean particle diameter from about 1 to 2.5 μm. In a preferred embodiment, the first antiblocking agent has been subjected to an organic aftertreatment coating which preferably contains a carboxylic acid such as citric acid. In still another preferred embodiment, the first and second blocking agent are both $SiO_2$, and each is present in the outer layer in an amount of about 0.05 to 0.4% by weight of the outer layer.

In a preferred embodiment, the resin is a hydrocarbon resin and has a softening point of $\geq 140°$ C., preferably from about 140° to 160° C. In another preferred embodiment, the resins are preferably styrene resins, cyclopentadiene resins or terpin resins. In still another preferred embodiment, the multilayer film has a maximum water vapor permeability of about 1.0 g/m².d, preferably from about 0.6 to 0.8 g/m².d, based on a 20 μm film. In another preferred embodiment, the outer layer of the heat-sealable film is a mixture of the polypropylene copolymer and the polypropylene terpolymer. The copolymer is preferably an ethylene-propylene copolymer and the terpolymer is an ethylene-propylene-butylene terpolymer. Preferably the outer layer has a content of copolymer in the range from about 20 to 80% by weight, preferably from about 30 to 60% by weight, in particular from about 45 to 55% by weight, and a content of terpolymer in the range from about 80 to 20% by weight, preferably from about 40 to 70% by weight, in particular from about 45 to 55% by weight, based on the total weight of the mixture.

More preferably, the mixture has a total ethylene content of about 2 to 5% by weight, a butylene content of about 2 to 8% by weight, and a propylene content of about 85 to 96% by weight, based on the total weight of the mixture. Preferably, the outer layer contains silicone oil such as polydimethylsiloxane in an amount of about 0.3 to 3.0% by weight.

Another aspect of the present invention provides a process for the production of the heat-sealable multilayer polyolefin film comprising the steps of coextruding melts corresponding to the individual layers of the film through a flat-film die, taking the coextruded film off over a take-off roll whose temperature is from about 10° to 110° C., biaxially stretching the film at a longitudinal stretching ratio of about 4:1 to 7:1 and a transverse stretching ratio of about 8:1 to 11:1, heat-setting the biaxially stretched film, optionally corona-treating the heat-set film and subsequently winding up the film, and wherein the film has a coefficient of friction after about 10 days from about 0.2 to 0.35. In a preferred embodiment, the first and second antiblocking agents are incorporated into the outer layer of the multilayer film.

Another aspect of the present invention provides a packaged article comprising the heat-sealable multilayer polyolefin film surrounding at least in part an article.

DETAILED DESCRIPTION OF THE PREFERRED EMBODIMENTS

This object is achieved according to the invention by a film of the generic type mentioned at the outset, wherein the heat-sealable outer layer contains a propylene copolymer and/or a propylene terpolymer and a mixture of an antiblocking agent having a mean particle diameter of about 3 to 5 μm and a second antiblocking agent having a mean particle diameter of about 1 to 2.5 μm.

The base layer of the multilayer film according to the invention essentially comprises a polypropylene polymer and, if desired, effective amounts of additives. The polypropylene polymer contains predominantly (at least about 90%) propylene and has a melting point of about 140° or above, preferably from about 150° to 170° C. Isotactic homopolypropylene having an n-heptane-soluble content of about 6% by weight or less, based on the isotactic homopolypropylene, copolymers of ethylene and propylene having an ethylene content of about 5% by weight or less, and copolymers of propylene and C4-C8-α-olefins having an α-olefin content of about 5% by weight or less are preferred polypropylene polymers for the base layer, particular preference being given to isotactic polypropylene. The weight percentages are based on the total weight of each respective copolymer. The polypropylene polymer of the base layer generally has a melt flow index from about 0.5 g/10 min to 10 g/10 min, preferably from about 1.5 g/10 min to 4 g/10 min, at about 230° C. and a force of about 21.6 N (DIN 53 735).

The polypropylene polymer employed in the base layer may be partially degraded by addition of organic peroxides. A measure of the degree of degradation of the polymer is the degradation factor A, which gives the relative change in the melt flow index, measured in accordance with DIN 53 735, of the polypropylene, based on the starting polymer.

$$A = \frac{MFI_2}{MFI_1}$$

$MFI_1$=melt flow index of the polypropylene polymer before addition of the organic peroxide.

$MFI_2$=melt flow index of the polypropylene polymer degraded by peroxide.

In general, the degradation factor A of the polypropylene polymer employed for the base layer is in the range from about 3 to 15, preferably from about 6 to 10.

Preferred organic peroxides are dialkyl peroxides, where the term alkyl radical is defined as a conventional saturated, straight-chain or branched lower alkyl radical having up to six carbon atoms. Particularly preference is given to 2,5-dimethyl-2,5-di(t-butylperoxide)-hexane and di-t-butyl peroxide.

The base layer of the film according to the invention contains a resin, generally in an amount from about 1 to 30% by weight, preferably from about 3 to 20% by weight, in particular from about 5 to 15% by weight, based on the weight of the base layer. Preferred resins are low-molecular-weight resins, in particular hydrocarbon resins. The hydrocarbon resins may be partially or fully hydrogenated. Suitable resins are synthetic resins or resins of natural origin. It has proven particularly advantageous to employ resins having a softening point of about ≧140° C. (measured in accordance with DIN 1995-U4 or ASTM E-28), those having a softening point from about 140° to 180° C. being preferred.

Of the numerous resins, hydrocarbon resins re preferred, particularly in the form of petroleum resins, styrene resins, cyclopentadiene resins and terpene resins (these resins are described in Ullmanns Encyklopädie der techn. Chemie [Ullmann's Encyclopedia of Industrial Chemistry], 4th Edition, Volume 12, pages 525 to 555).

The petroleum resins are those hydrocarbon resins prepared by polymerization of deep-decomposed petroleum materials in the presence of a catalyst. These petroleum materials usually contain a mixture of resin-forming substances, such as styrene, methylstyrene, vinyltoluene, indene, methylindene, butadiene, isoprene, piperylene and pentylene. The styrene resins are low-molecular-weight homopolymers of styrene or copolymers of styrene with other monomers such as methylstyrene, vinyltoluene and butadiene. The cyclopentadiene resins are cyclopentadiene homopolymers or cyclopentadiene copolymers obtained from coal tar distillates and fractionated petroleum gas. These cyclopentadiene resins are prepared by keeping the materials containing cyclopentadiene at high temperature for a long time. Depending on the reaction temperature, dimers, trimers or oligomers can be obtained.

The terpene resins are polymers of terpenes, i.e., hydrocarbons of the formula $C_{10}H_{16}$, which are present in virtually all essential oils or oil-containing resins from plants, and phenol-modified terpene resins. Specific examples of terpenes which may be used in the present invention are pinene, α-pinene, dipentene, limonene, myrcene, camphene and similar terpenes. The hydrocarbon resins can also be so-called modified hydrocarbon resins. The modification is generally carried out by reaction of the raw materials before the polymerization, by the introduction of specific monomers or by reaction by the polymerized product, particularly by hydrogenation or partial hydrogenation.

Hydrocarbon resins employed are also styrene homopolymers, styrene copolymers, cyclopentadiene homopolymers, cyclopentadiene copolymers and/or terpene polymers having a softening point of in each case above 100° C. (in the case of unsaturated polymers, the hydrogenated product is preferred). Very particular preference is given in the base layer to cyclopentadiene polymers having a softening point of 140° C. or above.

The multilayer film is provided according to the invention with at least one outer layer containing a heat-sealable polypropylene copolymer and/or polypropylene terpolymer and a mixture of antiblocking agents.

For the purposes of the present invention, particularly suitable polypropylene copolymers are random ethylene ($C_2$)-propylene ($C_3$) copolymers. The ethylene content of the copolymers is generally in the range from about 3 to 7% by weight, preferably in the range from about 3.5 to 5% by weight. Copolymers having a melt flow index (measured in accordance with DIN 53 735 at 230° C., load of 2.16 N) in the range from about 1 to 15 g/10 min, preferably from about 4 to 10 g/10 min and a melting point as measured by a differential scanning calorimeter (DSC) in the range from about 130° to 145° C., preferably from about 135° to 140° C. are particularly advantageous.

For the purposes of the present invention, particularly suitable polypropylene terpolymers are exthylene ($C_2$)/propylene ($C_3$)/butylene ($C_4$) terpolymers. The $C_2/C_3/C_4$-terpolymers generally have an ethylene content from about 2 to 5% by weight, preferably from about 3.5 to 4.5% by weight, a butylene content from about 5 to 10% by weight, preferably from about 6 to 8% by weight, and a corresponding propylene content from about 85 to 93% by weight. The melt flow index of the terpolymer is generally in the range from about 1 to 15 g/10 min, preferably in the range from about 5 to 10 g/10 min. The melting point (DSC) is in the range from about 130° to 140° C. and is preferably about 135° C. All weight percentage data regarding the copolymers and terpolymers described above relate to the particular copolymer or terpolymer.

It has been found that embodiments of the present invention having a minimum heat-sealing temperature in the range from about 100° to 115° C. are particularly advantageous. Surprisingly, such a minimum heat-sealing temperature can be achieved within this narrow range of about 100° to 115° C. by means of a mixture of the above-described copolymers and terpolymers. It has been found that the resin incorporated into the base layer of the film partially migrates into the outer layer and reduces the minimum heat-sealing temperature compared with films which do not have a resin-containing base layer. Nevertheless, the minimum heat sealing temperature can be adjusted very precisely to the range of about 100° to 115° C. by means of the outer layer mixture of copolymers and terpolymers. The content of the copolymers and terpolymers in the mixture can vary within broad limits. However, the composition is advantageously selected so that the $C_2$ content of the mixture is in the range from about 2 to 5% by weight and preferably from about 3 to 4% by weight, the $C_3$ content of the mixture is in the range from 85 to 96% by weight, preferably from about 88% to 94% by weight, and the $C_4$ content of the mixture in the range from about 2 to 8% by weight, preferably from about 4 to 6% by weight. The copolymer content of the mixture is generally from about 20 to 80% by weight, preferably from about 30 to 60% by weight, in particular from about 45 to 55% by weight. The terpolymer content of the mixture is normally from about 20 to 80% by weight and preferably from about 40 to 70% by weight, in particular from about 45 to 55% by weight. All weight percentage data to the above-described mixture of copolymer and terpolymer relate to the mixture being described.

For the purpose of the present invention, a mixture is taken to mean either a mechanical mixture or a blend of the individual components, with mechanical mixtures having proven advantageous and being preferred. Mechanical mixtures provide more opportunities in film production to optimize the composition of the outer layer. A blend is generally obtained from the film manufacturer as a raw material having a defined composition which cannot easily be changed even by the film manufacturer.

The above-described outer layer polymers can also be degraded by peroxides in an analogous manner to that described above for the base layer. In principle, the same peroxides as described above are used for the degradation. The degradation factor A of the outer layer polymers is generally in the range from about 3 to 15, preferably from about 6 to 10.

It is essential to the invention that the polymer or polymer mixture of the outer layer contains a combination of two antiblocking agents which are different with respect to their size. Suitable antiblocking agents are conventionally used substances such as $SiO_2$, silicates, diatomaceous earth, chalk, $CaCO_3$, $TIO_2$, etc. $SiO_2$ has proven particularly advantageous. $SiO_2$ is generally prepared by grinding silica gel and is a synthetic, highly porous, pure silicic acid which has an entirely amorphous structure, in contrast to crystalline silicic acids. The $SiO_2$ content is generally above about 95%, in particular in the range from about 98 to 99.5%.

The first, coarse antiblocking agent has a mean particle diameter from about 3 to 5 μm, preferably from about 3.5 to 4.5 μm, particular preference being given to $SiO_2$ having this particle size.

In a particularly advantageous embodiment, the $SiO_2$ particles having a mean particle diameter from about 3 to 5 μm have been subjected to an organic aftertreatment coating and have a coating containing from about 0.5 to 5% of an aliphatic carboxylic acid. Preferred aliphatic carboxylic acids are aliphatic hydroxydi- and tricarboxylic acids or stearic acid. In general, the acids have from two to five, preferably from two to three, hydroxyl groups. Preferred aliphatic carboxylic acids are tartonic acid (hydroxymalonic acid), malic acid (monohydroxysuccinic acid), tartaric acid (dihydroxysuccinic acid) and citric acid. Coatings containing citric acid have proven very particularly advantageous. As a consequence of the organic coating, the coarse $SiO_2$ particles are slightly aqueous suspension is in the range from about 3 to 5 preferably about 4.

The content of coarse antiblocking agents, in particular $SiO_2$, is in the range from about 0.05 to 0.4% by weight, preferably from about 0.1 to 0.25% by weight, based on the outer layer.

The second, fine antiblocking agent has a mean particle diameter from about 1 to 2.5 μm, preferably about 2 μm. The preferred fine antiblocking agent is likewise $SiO_2$, this generally being employed without an organic aftertreatment coating. The content in the outer layer is from about 0.05 to 0.4% by weight, preferably from about 0.1 to 0.25% by weight.

In a preferred embodiment, the outer layer furthermore additionally contains silicone oil, generally in an amount of from about 0.3 to 3% by weight, based on the outer layer. The viscosity of the silicone oil is generally from about 20,000 to 3,000,000 mm$^2$/s, preferably from 20,000 to 1,000,000 mm$^2$/s. Preferred silicone oils are polydialkyl siloxanes, in particular those containing alkyl radicals having 1 to 6 carbon atoms. Polydimethylsiloxane is particularly advantageous, especially if it is present in an amount from about 0.5 to 3% by weight, based on the outer layer, and has a viscosity from about 20,000 to 1,000,000 mm$^2$/s.

The multilayer film according to the present invention comprises at least the above-described base layer and at least one outer layer containing the above-described polymers or mixtures thereof and the above-described antiblocking agent mixture. Depending on its intended application, the multilayer film can have a further outer layer on the opposite side. In a preferred embodiment, the multilayer film has three layers, where the outer layers may be identical or different. Preference is given to films with outer layers of identical composition.

The thickness of the outer layer(s) is greater than about 0.2 µm and is preferably in the range from about 0.4 to 3 µm, in particular from about 0.4 to 2 µm, where outer layers on both sides may have identical or different thickness.

The overall thickness of the multilayer polyolefin film according to the present invention can vary within broad limits and depends on the intended application. It is preferably from about 5 to 70 µm, in particular from about 10 to 50 µm with base layer making up from about 50 to 95% of the overall film thickness.

In another embodiment, in addition to the selected additives mentioned above for the outer layer(s), the multilayer film according to the present invention may additionally contain neutralizers, antistatics and stabilizers.

The stabilizers employed can be conventional stabilizing compounds for ethylene, propylene and other α-olefin polymers. The amount of stabilizer added is from about 0.05 to 2% by weight. Phenolic stabilizers, alkali/alkaline earth metal stearates and/or alkali/alkaline earth metal carbonates are particularly suitable.

Phenolic stabilizers are preferably added in an amount from about 0.1 to 0.6% by weight, particularly from about 0.15 to 0.3% by weight, and have a molecular weight greater than 500 g/mol. Pentaerythrityl tetrakis[3-(3,5-di-tert-butyl-4-hydroxyphenyl)propionate] and 1,3,5-trimethyl-2,4,6-tris(3,5-di-tert-butyl-4-hydroxybenzyl)benzene are particularly advantageous.

The neutralizers employed are preferably calcium stearate, dihydrotalcite and/or calcium carbonate having a mean particle size of at most about 0.7 µm, an absolute particle size of less than about 10 µm and a specific surface area of at least about 40 m$^2$/g.

The preferred antistatics are alkali metal alkanesulfonates, polyether-modified, i.e., ethoxylated and/or propoxylated polydiorganosiloxanes (polydialkylsiloxanes, polyalkylphenylsiloxanes and the like) and/or essentially straight-chain and saturated, aliphatic tertiary amines containing an aliphatic radical having 10 to 20 carbon atoms which are substituted by ω-hydroxy-($C_1$–$C_4$)-alkyl groups, N,N-bis(2-hydroxyethyl)alkylamines having 10 to 20 carbon atoms, preferably 12 to 18 carbon atoms, in the alkyl radical being particularly suitable. The effective amount of antistatic is in the range from about 0.05 to 3% by weight. A further preferred antistatic is glycerol monostearate.

The present invention furthermore relates to a process for the production of the multilayer film according to the invention by the coextrusion process known per se. This process involves coextruding the melts corresponding to the individual layers of the film through a flat-film die, taking off the resultant film on one or more rolls for solidification, subsequently biaxially stretching (orienting) the film, heat-setting the biaxially stretched film and, if desired, corona-treating or flame-treating the film on the surface layer intended for corona or flame treatment.

The biaxial stretching (orientation) can be carried out simultaneously or consecutively, preference being given to consecutive biaxial stretching in which stretching is carried out first longitudinally (in the machine direction) and then transversely (perpendicular to the machine direction).

As is conventional in the coextrusion process, the polymer or polymer mixture of the individual layers is first compressed and liquefied in an extruder, it being possible for any additives to be already contained in the polymer or polymer mixture or added at this time. The melts are then simultaneously forced through a flat-film die (slot die), and the extruded multilayer film is taken off on one or more take-off rolls, during which it cools and solidifies.

The resultant film is then stretched longitudinally and transversely to the extrusion direction, which results in an orientation of the molecule chains. The stretching ratio in the longitudinal direction is preferably from about 4:1 to 7:1 and the transverse direction stretching ratio is preferably from about 7:1 to 10:1. The longitudinal stretching is expediently carried out with the aid of two rolls running at different speeds corresponding to the desired stretching ratio, and the transverse stretching is carried out with the aid of an appropriate tenter frame.

The biaxial stretching of the film is followed by heat setting (heat treatment) thereof, during this treatment the film is kept at a temperature of about 100° to 160°, for about 0 5 to 10 seconds. The film is subsequently wound up in a conventional manner using a wind-up unit.

It has proven particularly favorable to keep the take-off roll or rolls, which also cool and solidify the extruded film, at a temperature from about 10° to 110° C., preferably from about 20° to 60° C.

The temperatures at which the longitudinal and transverse stretching are carried out may vary. In general, the longitudinal stretching is preferably carried out from about 100° to 150° C., and the transverse stretching from about 140° to 190° C.

If desired, as mentioned above, the biaxial stretching can be followed by corona or flame treatment of one or both surfaces of the film by one of the known methods. Only outer layers which are silicone oil-free are corona or flame treated. The corona or flame treatment of a heat-sealable outer layer containing silicone oil destroys or impairs its heat-sealability.

Corona treatment involves passing the film between two conductor elements serving as electrodes with such a high voltage, usually an alternating voltage (from about 10 to 20 kV and 20 to 40 kHz), being applied between the electrodes that spray or corona discharge can occur. The spray or corona discharge causes the air above the film surface to ionize and react with the molecules of the film surface, forming polar inclusions in the essentially nonpolar polymer matrix.

For flame treatment with a polarized flame (see U.S. Pat. No. 4,622,237), a direct electrical voltage is applied between a burner (negative pole) and a chill roll. The level of the applied voltage is from about 200 to 3,000 V, preferably in the range from about 500 to 2,000 V. The applied voltage increases the acceleration of the ionized atoms, which hit the polymer surface with greater kinetic energy. The chemical bonds within the polymer molecule become easier to break, and the formation of free radicals proceeds more rapidly. The thermal load on the polymer during this procedure is substantially less than in the case of standard flame treatment, and films can be obtained in which the heat-sealing properties of the treated side are even better than those of the untreated side.

It has been found that the resin-containing films whose outer layer(s) have been treated with the antiblocking agent combination according to the invention have been significantly improved with respect to their running properties, blocking properties at elevated temperatures and heat-sealing properties. Surprisingly, significantly improved seal seam strengths are achieved. In particular, it is possible to significantly improve the results of rapid sealing. Rapid sealing is carried out using a shortened sealing time and a reduced pressure (sealing conditions 140° C., 0.35 N/cm$^2$ and 0.15 s). Surprisingly, seal seam strengths which are entirely comparable with the strengths achieved under conventional conditions (130° C., sealing time 0.5 s, sealing pressure 10 N/mm$^2$) are obtained under these conditions. This enables the speed of packaging machines to be increased. In general, the seal seam strengths (sealing conditions 140° C., 0.35 N/cm$^2$ and 0.15 s) are greater than about 1.2 N/15 mm, preferably in the range from about 1.5 to 2.5 N/15 mm. Surprisingly, the films according to the invention, in spite of their resin-containing base layer, have very good blocking values (properties) at elevated temperatures. The blocking behavior at elevated temperatures is an important quality feature of film packaging, since cigarette packs which block stick to one another at elevated temperatures, as can occur in automatic cigarette machines, and can no longer be removed from the machine. In general, the elevated temperature blocking values of the films according to the invention are in the range from about 0.5 to 10 N, preferably in the range from about 1 to 6 N.

The film according to the invention is also distinguished by excellent barrier properties, in particular with respect to water vapor, oxygen and aromas. Adverse effects due to the addition of resin, such as high blocking values at elevated temperatures, which had to be accepted in conventional films in favor of the improved barrier, can be reduced or eliminated here. Thus, surprisingly, a film can be provided which simultaneously improves properties which were previously impossible to improve together in a film.

The use of the preferred resins having a softening point of about ≧140° C. has proven particularly advantageous with respect to the optical properties and the shrinkage behavior of the films. In addition, fewer or no deposits occur on the rolls during film production when these resins are used.

It has furthermore been found that films containing the antiblocking agent combination according to the invention in the outer layer(s) and simultaneously having a minimum heat-sealing temperature of from about 100° to 115° C. have very particular advantages as packaging films on high-speed packaging machines. This reduction in the minimum heat-sealing temperature enables a further increase in the machine packaging speed, since a significantly shorter sealing time is required for the same temperature compared to films that are known in the art. This reduction in heat-sealing temperature also makes it possible to reduce the temperature in the sealing zone, which provides considerable savings in energy. It has been found that a reduction in the minimum heat-sealing temperature to a range from about 100° to 115° C., particularly in the case of rapid sealing, gives good seal seam strengths, only if the outer layer contains the combination according to the invention of the coarse (first) and fine (second) antiblocking agents.

The sliding friction of the film has been optimized for good wrapping and is generally in the range from 0.2 to 0.35. Films which are too smooth result in loose wrapping, and films which are too matt (unsmooth) tend to block and result in wrinkling. A coefficient of sliding friction in the ideal range of about 0.2 and 0.35 ensures fault-free running.

The embodiment of the film according to the invention having a selected minimum heat-sealing temperature of from about 100° to 115° C. thus represents a film which has been particularly improved compared with the prior art and is, in particular, highly suitable as a cigarette wrapping film.

In summary, it should be stated that the film according to the invention offers a particularly advantageous selection of improved properties, in particular excellent seal seam strength, particularly in the case of rapid sealing very good blocking values at elevated temperature excellent running on high-speed machines optimized sliding friction values tight cigarette wrapping excellent barrier properties The invention is now illustrated in greater detail with reference to the following working examples.

EXAMPLE 1

A three-layer film having an overall thickness of 20 μm and an ABA layer structure, i.e., the base layer B was surrounded by two identical outer layers A, was produced by coextrusion and subsequent stepwise orientation in the longitudinal and transverse directions. Each of the outer layers had a thickness of 0.7 μm.

All the layers contained 0.13% by weight of pentaerythrityl tetrakis[4-(3,5-di-tert-butyl-4-hydroxyphenyl)propionate] (Irganox® 1010) as stabilizer and 0.06% by weight of calcium stearate as neutralizer.

The base layer B essentially comprised a polypropylene homopolymer containing 10% by weight of added resin, based on the base layer. The propylene homopolymer had an n-heptane-soluble content of 4% by weight and a melting point of from 160° to 162° C. The melt flow index was 3.2 g/10 min at 230° C. and a load of 21.6 N (DIN 53 735). The resin had a softening point of 40° C. and was purchased under the trade name ESCOREZ® ECR 356 from Exxon, Darien, Conn., U.S.A.

The polyolefin outer layers essentially comprised a mixture of 50% by weight of a random ethylene-propylene copolymer having a content of 4% by weight of ethylene, and 50% by weight of ethylene-propylene-1-butene terpolymer having a content of 3% by weight of ethylene and 8% by weight of 1-butene, so that the outer layer mixture had an ethylene content of 3.5% by weight, a propylene content of 92.5% by weight and a 1-butene content of 4% by weight.

The polyolefin outer layers each contained 0.9% by weight of a polydimethylsiloxane having a viscosity of 30,000 mm$^2$/s, 0.17% by weight of an organically aftertreated coated silicon dioxide having a mean particle diameter of 4 μm and 0.17% by weight of a non-organically aftertreated silicon dioxide having a mean particle diameter of 2 μm.

EXAMPLE 2

Example 1 was repeated, but the film did not have an ABA structure, but instead an ABC structure, i.e., the base layer B was surrounded by different outer layers A and C. Outer layer A was identical to the outer layers A from Example 1, but contained no polydimethylsiloxane. Outer layer C was identical to the outer layers A from Example 1, but contained 1.8% by weight of polydimethylsiloxane, having a viscosity of 30,000 mm$^2$/s.

EXAMPLE 3

Example 1 was repeated. The film had an ABA structure as in Example 1. The polyolefin outer layers essentially comprised a mixture of 30% by weight of a random ethylene-propylene copolymer having a content of 4% by weight of ethylene, and 70% by weight of ethylene-propylene-1-butene terpolymer having a content of 3% by weight of ethylene and a content of 8% by weight of 1-butene, so that the outer layer mixture had an ethylene content of 3.3% by weight, a propylene content of 91.1% by weight and a 1-butene content of 5.6% by weight.

EXAMPLE 4

Example 3 was repeated. The polyolefin outer layers contained 1.0% by weight of a polydimethylsiloxane having a viscosity of 30,000 mm$^2$/s, 0.20% by weight of an organically aftertreated coated silicon dioxide having a mean particle diameter of 4 μm and 0.14% by weight of a non-organically aftertreated silicon dioxide having a mean particle diameter of 2 μm.

EXAMPLE 5

Example 1 was repeated. The polyolefin outer layers essentially comprised a mixture of 40% by weight of a random ethylene-propylene copolymer having a content of 4% by weight of ethylene, and 60% by weight of an ethylene-propylene-1-butene terpolymer having a content of 4% by weight of ethylene and 6% by weight of 1-butene, so that the outer layer mixture had an ethylene content of 4% by weight, a propylene content of 92.4% by weight and a 1-butene content of 3.6% by weight.

COMPARATIVE EXAMPLE 1

Example 1 was repeated. The polyolefin outer layers each contained 0.9% by weight of a polydimethylsiloxane having a viscosity of 30,000 mm$^2$/s and 0.17% by weight of a non-organic aftertreated silicon dioxide having a mean particle diameter of 2 μm.

COMPARATIVE EXAMPLE 2

Comparative Example 1 was repeated. The polyolefin outer layers each contained 0.9% by weight of a polydimethylsiloxane having a viscosity of 30,000 mm$^2$/s and 0.34% by weight of non-organically aftertreated silicon dioxide having a mean particle diameter of 2 μm.

COMPARATIVE EXAMPLE 3

Example 1 was repeated. The polyolefin outer layers each contained 0.9% by weight of a polydimethylsiloxane having a viscosity of 30,000 mm$^2$/s and 0.34% by weight of organically aftertreated coated silicon dioxide having a mean particle diameter of 4 μm.

The properties of the films of the examples and comparative examples are shown in the table below.

The raw materials and films were characterized using the following measurement methods:

Melt Flow Index

The melt flow index was measured in accordance with DIN 53 735 at a load of 21.6 N and 230° C. or at a load of 50 N and 190° C.

Melting Point

DSC measurement, maximum of the melting curve, heating rate 20° C./min.

Softening Point

The softening point of the resins is determined in accordance with DIN 1995-U4 or ASTM E-28.

Haze

The haze of the film was measured in accordance with ASTM-D 1003-52.

Gloss

The gloss was determined in accordance with DIN 67 530. The reflection value was measured as an optical characteristic of the surface of a film. In accordance with the standards ASTM-D 523-78 and ISO 2813, the angle of incidence was set at 20°, 60° or 85°. A light beam hits the planar test surface at the set angle of incidence and is reflected or scattered thereby. The light beams incident on the photoelectronic receiver are indicated as a proportional electrical quantity. The measurement value is dimensionless and must be given together with the angle of incidence.

Seal Seam Strength After Rapid Sealing

For the determination, two film strips 15 mm in width were laid one on top of the other and sealed at 140° C. for 0.15 sec at a pressure of 0.35 N/cm$^2$ (instrument used: Brugger type NDS with sealing jaws heated on one side). The seal seam strength was determined by the T-peel method.

Friction

The coefficient of sliding friction was determined in accordance with DIN 53 375.

Blocking Values at Elevated Temperature

The elevated-temperature blocking test involves measurement of the push-off forces in Newtons (N) necessary to move or separate two film-wrapped packs which have been exposed to a temperature of 70° C. and a weight of 200 g for 2 hours.

Surface Tension

The surface tension was determined by the ink method (DIN 53 364).

Printability

The corona-treated films were printed 14 days after production (short-term assessment) and 6 months after production (long-term assessment). The ink adhesion was assessed by the adhesion-tape test. If the adhesive tape was able to remove a small amount of ink, the ink adhesion was assessed as being moderate and if a significant amount of ink was removed, it was assessed as being poor.

Determination of the Minimum Heat-Sealing Temperature

Heat-sealed samples (seal seam 20 mm×100 mm) are produced using the Brugger HSG/ET sealing unit by sealing a film at different temperatures with the aid of two heated sealing jaws at a pressure of 10 N/cm$^2$ for 0.5 sec. Test strips with a width of 15 mm are cut out of the sealed samples. The T-peel seam strength, i.e., the force necessary to separate the test strips, is determined using a tensile testing machine at a peel rate of 200 mm/min, during which the seal seam plane forms a right angle with the direction of tension. The minimum heat-sealing temperature is the temperature at which a seal seam strength of at least 0.5 N/15 mm is achieved.

Determination of the Water Vapor and Oxygen Permeability

The water vapor permeability is determined in accordance with DIN 53 122, Part 2. The oxygen barrier action is determined in accordance with draft DIN 53 380, Part 3, at an atmospheric humidity of 53%.

TABLE

| | Minimum heat-sealing temperature (10 N/cm²; 0.5 s) [°C.] | | Seal seam strength = HSZ (140° C.; 0.35 N/cm²; 0.15 s) [N/15 mm] | | Blocking values at elevated temperature [N] | | Coefficient of sliding friction | | Water vapor permeability [g/m² · d] | O₂ permeability [cm³/m² · d · bar] | Passage through a cigarette wrapping machine (Type GD X2) running at 400 packs/min |
|---|---|---|---|---|---|---|---|---|---|---|---|
| | Side 1 | Side 2 | Side 1/1 | Side 2/2 | Side 1/1 | Side 2/2 | Side 1/1 | Side 2/2 | | | |
| E1 | 106 | 106 | 2.4 | 2.4 | 4.5 | 4.5 | 0.28 | 0.29 | 0.85 | 1070 | ++ |
| E2 | 106 | 106 | 2.3 | 2.5 | 4.9 | 4.7 | 0.27 | 0.26 | 0.84 | 1060 | ++ |
| E3 | 104 | 103 | 2.7 | 2.7 | 5.4 | 5.3 | 0.30 | 0.31 | 0.85 | 1090 | ++ |
| E4 | 103 | 104 | 2.6 | 2.7 | 5.3 | 5.2 | 0.29 | 0.28 | 0.83 | 1060 | ++ |
| E5 | 107 | 106 | 2.3 | 2.3 | 5.4 | 5.7 | 0.30 | 0.30 | 0.86 | 1100 | ++ |
| CE1 | 105 | 105 | 2.5 | 2.7 | >15 | >15 | 0.42* | 0.44* | 0.84 | 1060 | Film partly sticks and blocks; earing. |
| CE2 | 105 | 106 | 2.3 | 2.5 | >12 | >12 | 0.38* | 0.40* | 0.87 | 1090 | Same as for CE1, but not so pronounced. |
| CE3 | 109 | 109 | 1.0 | 1.0 | 6 | 7 | 0.32 | 0.33 | 0.84 | 1000 | Seal seems partly leaky. |

*Film blocked
E = Example; CE = Comparative Example

What is claimed is:

1. An oriented, heat-sealable, multilayer polyolefin film comprising a base layer containing polypropylene and a resin, and at least one heat-sealable outer layer, wherein the heat-sealable outer layer comprises one or more of a polypropylene copolymer and a polypropylene terpolymer and a mixture of a first antiblocking agent having a mean particle diameter from about 3 to 5 μm and a second antiblocking agent having a mean particle diameter from about 1 to 2.5 μm.

2. A multilayer polyolefin film as claimed in claim 1, wherein the first antiblocking agent has an organic coating.

3. A multilayer polyolefin film as claimed in claim 2, wherein the first antiblocking agent has a coating containing carboxylic acid.

4. A multilayer polyolefin film as claimed in claim 1, wherein the first antiblocking agent is $SiO_2$, and wherein the second antiblocking agent is $SiO_2$.

5. A multilayer polyolefin film as claimed in claim 1, wherein the first antiblocking agent is present in an amount from about 0.05 to 0.4% by weight, based on the weight of the outer layer, and the second antiblocking agent is present in an amount from about 0.05 to 0.4% by weight, based on the outer layer.

6. A multilayer polyolefin film as claimed in claim 1, wherein the resin is a hydrocarbon resin and has a softening point of about $\geq 140°$ C.

7. A multilayer polyolefin film as claimed in claim 1, wherein the heat-sealable outer layer has a minimum heat-sealing temperature in the range from about 100° to 115° C., and the seal seam strength of the film as measured at 140° C., 0 35 N/cm², 0.15 s is greater than about 12 N/15 mm.

8. A multilayer polyolefin film as claimed in claim 1, wherein the multilayer film has a maximum water vapor permeability of about 1.0 g/m².d, based on a 20 μm film.

9. A multilayer polyolefin film as claimed in claim 1, wherein the polypropylene copolymer is an ethylene($C_2$)-propylene($C_3$) copolymer, and the polypropylene terpolymer is an ethylene($C_2$)-propylene($C_3$)butylene($C_3$)-($C_4$) terpolymer.

10. A multilayer polyolefin film as claimed in claim 9, wherein the heat-sealable outer layer essentially comprises a mixture of the ethylene-propylene copolymer and the ethylene-propylene-butylene terpolymer, and wherein the mixture has an ethylene content from about 2 to 5% by weight, a butylene content from about 2 to 8% by weight and a propylene content of from about 85 to 96% by weight, in each case based on the weight of the mixture.

11. A multilayer polyolefin film as claimed in claim 9, wherein the ethylene-propylene copolymer has an ethylene content from about 3 to 7% by weight, and the $C_2/C_3/C_4$-terpolymer has a $C_2$ content from about 2 to 5% by weight, a $C_3$ content from about 85 to 93% by weight and a $C_4$ content from about 5 to 10% by weight, based on the particular copolymer or terpolymer.

12. A multilayer polyolefin film as claimed in claim 10, wherein the mixture of the $C_2/C_3$-copolymers and the $C_2/C_3/C_4$-terpolymers has a content of copolymer in the range from about 20 to 80% by weight, and a content of terpolymer in the range from about 80 to 20% by weight.

13. A multilayer polyolefin film as claimed in claim 1, wherein the thickness of the heat-sealable outer layer is in the range from about 0.4 to 2 μm.

14. A multilayer polyolefin film as claimed in claim 1, wherein the heat-sealable outer layer contains a silicone oil in an amount of about 0.3 to 3.0% by weight based on the outer layer.

15. A multilayer polyolefin film as claimed in claim 14, wherein the silicone oil is a polydimethylsiloxane which has a viscosity in the range of about 20,000 to 3,000,000 mm²/s.

16. A multilayer polyolefin film as claimed in claim 1, wherein the resins are selected from the group consisting of petroleum resins, styrene resins, cyclopentadiene resins or terpin resins.

17. A multilayer polyolefin film as claimed in claim 1, wherein the coefficient of sliding friction of the film is in the range of about 0.2 to 0.35, and the film has blocking values at elevated temperatures in the range of about 2 to 8 N.

18. A multilayer polyolefin film as claimed in claim 1, which is produced by a process comprising coextruding the melts corresponding to the individual layers of the film through a flat-film die, taking the coextruded film off over a take-off roll whose temperature is about 10° to 110° C., biaxially stretching the film at a longitudinal stretching ratio from about 4:1 to 7:1 and a transverse stretching ratio from about 7:1 to 11:1, heat-setting the biaxially stretched film, optionally corona treating and subsequently winding the film up, and wherein the film has a coefficient of friction after about 10 days of about 0.2 to 0.35.

19. A multilayer polyolefin film as claimed in claim 2, wherein the second antiblocking agent does not have an organic coating.

20. A multilayer polyolefin film as claimed in claim 2, wherein the organic coating is selected from the group consisting of citric acid, tartonic acid, malic acid, stearic acid, and tartaric acid.

21. A multilayer polyolefin film as claimed in claim 1, which has a coefficient of friction of less than 0.35.

* * * * *